United States Patent
Lee

(10) Patent No.: US 6,882,909 B2
(45) Date of Patent: Apr. 19, 2005

(54) METHOD AND SYSTEM FOR REDUCING MOTOR SHOCK OF A HYBRID VEHICLE

(75) Inventor: Se-Jin Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 292 days.

(21) Appl. No.: 10/331,236

(22) Filed: Dec. 30, 2002

(65) Prior Publication Data

US 2004/0049328 A1 Mar. 11, 2004

(30) Foreign Application Priority Data

Sep. 5, 2002 (KR) ................................ 10-2002-0053521

(51) Int. Cl.[7] .............................. G06F 19/00; G06F 7/00
(52) U.S. Cl. ...................... 701/22; 701/51; 180/65.7; 318/3; 290/17; 290/34
(58) Field of Search .................... 701/22, 57; 180/65.7; 318/3; 290/17, 34

(56) References Cited

U.S. PATENT DOCUMENTS 5,982,045 A * 11/1999 Tabata et al. ................ 290/17
6,719,076 B1 * 4/2004 Tabata et al. ............... 180/65.7

FOREIGN PATENT DOCUMENTS

| JP | 06-006912 | 1/1994 |
|---|---|---|
| JP | 2000-261903 | 9/2000 |
| JP | 2002-243027 | 8/2002 |

* cited by examiner

Primary Examiner—Thomas G. Black
Assistant Examiner—Ronnie Mancho
(74) Attorney, Agent, or Firm—Morgan Lewis & Bockius LLP

(57) ABSTRACT

The method for reducing motor shock of a parallel hybrid electric vehicle equipped with a continuously variable transmission calculates an upper limit of acceleration and an upper limit of jerk of the vehicle based on vehicle speed; calculates a maximum motor torque and a maximum motor torque change rate based on the calculated upper limit of the acceleration and upper limit of the jerk; and generates a motor torque command such that a motor torque is less than the calculated maximum motor torque and a motor torque change rate is less than the calculated maximum motor torque change rate.

17 Claims, 3 Drawing Sheets

METHOD AND SYSTEM FOR REDUCING MOTOR SHOCK OF A HYBRID VEHICLE

FIELD OF THE INVENTION

The present invention relates to a method for reducing shock generated when a motor of a hybrid vehicle is started or is driving.

BACKGROUND OF THE INVENTION

Generally, a hybrid vehicle includes a motor for both maximizing fuel mileage and power characteristics of the vehicle by supplementing power from an engine. However, because the motor of the hybrid vehicle has a very quick response compared to the engine, it is necessary to restrict the amount of motor torque to reduce shocks generated by the motor that cause abrupt starting and tire slippage.

Methods have been developed for restricting or filtering motor torque to reduce such shocks caused by the motor. However, such methods depend on driving conditions and restrict motor torque so that it is difficult to use the motor to its full potential.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention, a method for reducing motor shock of a parallel hybrid electric vehicle equipped with a continuously variable transmission includes: calculating an upper limit of acceleration and an upper limit of jerk of the vehicle based on a vehicle speed; calculating a maximum motor torque and a maximum motor torque change rate based on the calculated upper limit of the acceleration and the upper limit of the jerk; and generating a motor torque command such that a motor torque is less than the calculated maximum motor torque and a motor torque change rate is less than the calculated maximum motor torque change rate.

Preferably, the maximum motor torque is calculated by the following equation:

$$T_{m\_max} = \frac{1}{f} \times T_{c\_max} - T_e = \frac{1}{f} \times \frac{a_{ub}mr_t}{R_g} - T_e$$

where $T_{m\_max}$ is the maximum motor torque, $a_{ub}$ is the upper limit of the acceleration, $T_{c\_max}$ is a clutch torque when a vehicle acceleration is the upper limit of the acceleration, f is a slip factor, m is a mass of the vehicle, $r_t$ is a tire radius, $R_g$ is a gear ratio of the continuously variable transmission, and $T_e$ is an engine torque. It is also preferable that the slip factor is equal to 1 when the clutch is locked, and the slip factor decreases as an amount of a slip increases.

It is further preferable that the maximum motor torque change rate is calculated by the following equation:

$$\dot{T}_{m\_max} = \frac{1}{f} \times \dot{T}_{c\_max} - \dot{T}_e = \frac{1}{f} \times \frac{j_{ub}mr_t - T_c\dot{R}_g}{R_g} - \dot{T}_e$$

where $\dot{T}_{m\_max}$ is the maximum motor torque change rate, $j_{ub}$ is the upper limit of the jerk, $\dot{T}_{c\_max}$ is a clutch torque change rate when a jerk of the vehicle is the upper limit of the jerk, f is a slip factor, m is a mass of the vehicle, $r_t$ is a tire radius, $R_g$ is a gear ratio of the continuously variable transmission, $\dot{R}_g$ is a gear ratio change rate of the continuously variable transmission, $T_c$ is a clutch torque when the jerk of the vehicle is the upper limit of the jerk, and $\dot{T}_e$ is an engine torque change rate.

In another preferred embodiment of the present invention, a system for reducing a motor shock of a parallel hybrid electric vehicle includes: an engine, a motor, a continuously variable transmission, a motor control unit, and a hybrid control unit. The engine generates a traction torque by burning fuel. The motor generates a traction torque using an electrical energy of an electrical energy storage unit. The continuously variable transmission is provided with the torques from the engine and the motor and performs gear shifting. The motor control unit controls an operation of the motor. The hybrid control unit outputs a motor torque command signal to the motor control unit, and the hybrid control unit is programmed to perform a method comprising: calculating an upper limit of an acceleration and an upper limit of a jerk of the vehicle based on a vehicle speed; calculating a maximum motor torque and a maximum motor torque change rate based on the calculated the upper limit of the acceleration and the upper limit of the jerk; and generating a motor torque command such that a motor torque is less than the calculated maximum motor torque and a motor torque change rate is less than the calculated maximum motor torque change rate.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

Hereinafter, a preferred embodiment of the present invention will be described in detail with reference to the accompanying drawings.

DETAILED DESCRIPTION OF THE INVENTION

Figure 3:
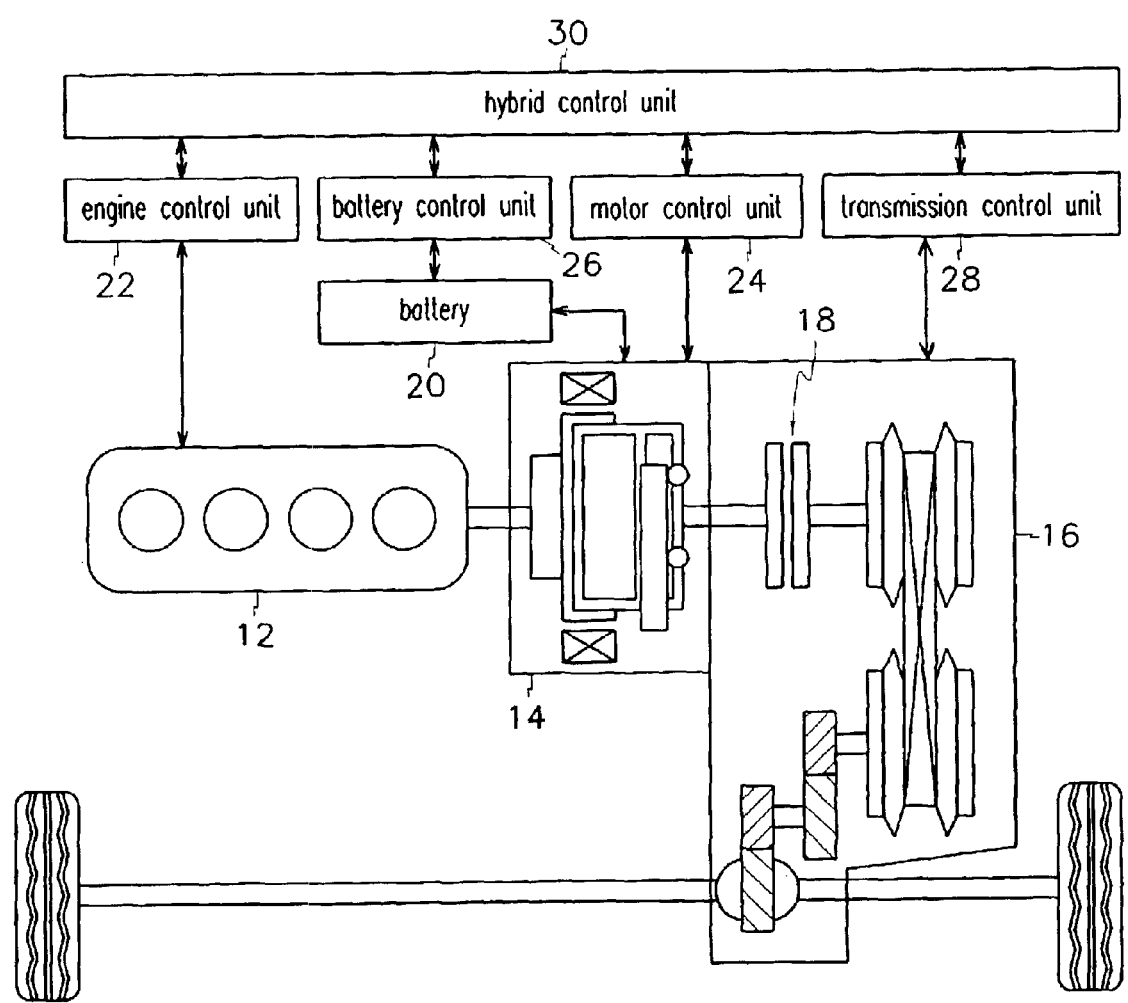
FIG. 3 is a power system to which the method for reducing motor torque according to a preferred embodiment of the present invention may be applied.

As shown in FIG. 3, a power system of a parallel hybrid electric vehicle, according to an embodiment of the present invention, comprises an engine 12; a motor 14; a continuously variable transmission 16; an electrical energy storage unit, such as a battery 20; an engine control unit 22 for controlling the engine 12; a motor control unit 24 for controlling the motor 14; a battery control unit 26 for controlling the battery 20; a transmission control unit 28 for controlling the continuously variable transmission 16; and a hybrid control unit 30 for controlling the engine control unit 22, the motor control unit 24, the battery control unit 26, and the transmission control unit 28.

The engine 12 generates a torque by burning fuel. Torque generated by the engine 12 is provided to the continuously variable transmission 16 via a clutch 18. The motor 14 generates torque by using electrical energy provided by the battery 20. The engine 12 and the motor 14 are configured such that the engine 12 and the motor 14 can each provide torque to the continuously variable transmission 16 simultaneously. The hybrid control unit 30 may comprise a processor, a memory, and associated hardware as may be selected and programmed by a person of ordinary skill in the art based on the teachings of the present invention.

Figure 1:
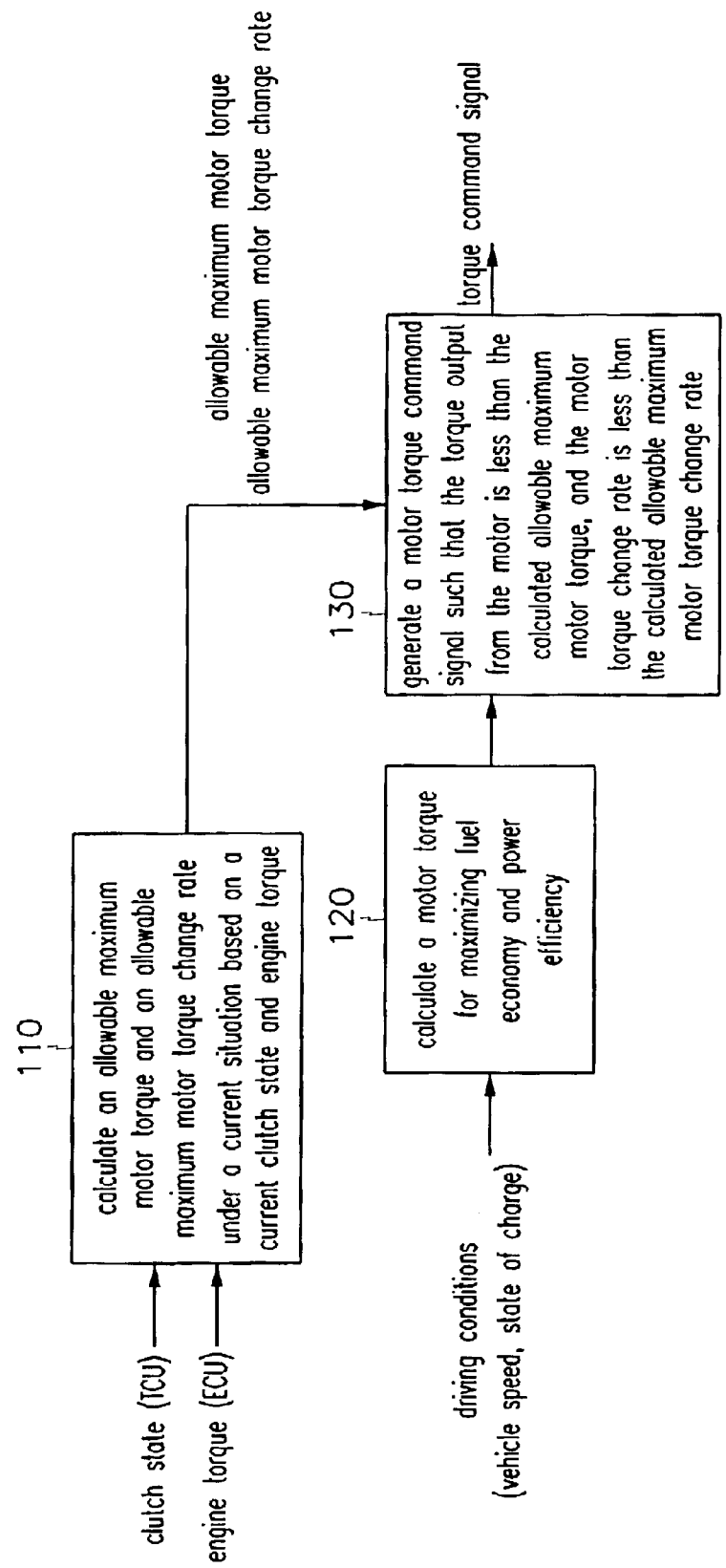
FIG. 1 is a block diagram showing the method for reducing motor shock of a hybrid vehicle according to a preferred embodiment of the present invention.

As shown in FIG. 1, in a method for reducing motor shock, the hybrid control unit 30 calculates an allowable maximum motor torque and an allowable maximum motor torque change rate under a current situation based on a current clutch state and engine torque (110). It is preferable that the clutch state information and the engine torque information are respectively input from the transmission control unit 28 and the engine control unit 22.

The hybrid control unit 30 also calculates a motor torque demanded from the motor 14 based on driving conditions, such as a vehicle speed and a state of charge of the battery 20, in order to maximize fuel economy and power efficiency (120). Then, the hybrid control unit 30 generates a motor torque command signal, such that the torque output from the motor is less than the calculated allowable maximum motor torque, and the motor torque change rate is less than the calculated allowable maximum motor torque change rate (130). That is, the hybrid control unit 30 restricts the motor torque to be below the maximum motor torque and the motor torque change rate to be below the maximum motor torque change rate, by restricting vehicle acceleration to be less than a predetermined acceleration and vehicle jerk to be less than a predetermined jerk, where jerk is the rate of charge of acceleration or the derivative of acceleration. The hybrid control unit 30 continuously calculates the maximum motor torque and the maximum motor torque change rate based on the clutch state and the engine torque, in order to reduce the motor shock of the hybrid electric vehicle.

Figure 2:
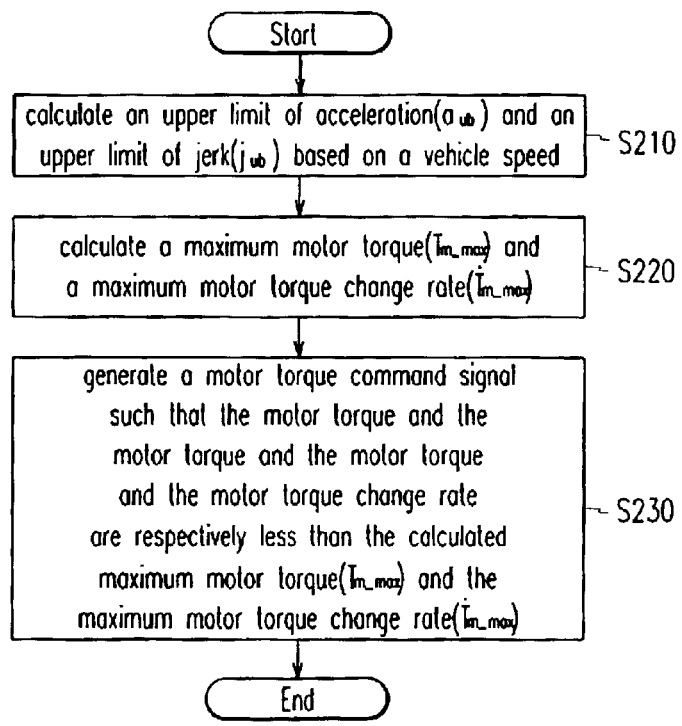
FIG. 2 is a flowchart of the method for reducing motor torque according to a preferred embodiment of the present invention.

As shown in FIG. 2, in the method for reducing shock generated by the motor of a parallel hybrid electric vehicle, the hybrid control unit 30 calculates an upper limit of acceleration $a_{ub}$ and an upper limit of jerk $j_{ub}$ based on vehicle speed, in step S210. The upper limits of acceleration and jerk of the vehicle are determined respectively as a maximum acceleration and a maximum jerk below which shocks generated by the motor are acceptable.

The acceleration limit and the jerk limit can preferably be determined on the basis of vehicle characteristics. For example, it is preferable that the higher the vehicle speed is, the higher the acceleration limit and the jerk limit become.

In the vehicle, the following equations can be derived:

$$a = \frac{T_c R_g}{m r_t} \quad \text{[Equation 1]}$$

$$j = \dot{a} = \frac{\dot{T}_c R_g + T_c \dot{R}_g}{m r_t}$$

where $T_c$ is a clutch torque, $R_g$ is a gear ratio of the continuously variable transmission, m is a mass of the vehicle, and $r_t$ is a tire radius.

Further, in order to maintain the vehicle acceleration between an upper limit and a lower limit and the vehicle jerk between an upper limit and a lower limit, the following equation 2 must be satisfied:

$$\frac{mr_t a_{lb}}{R_g} < T_c < \frac{mr_t a_{ub}}{R_g} \quad \text{[Equation 2]}$$

$$\frac{mr_t j_{lb} - T_c \dot{R}_g}{R_g} < \dot{T}_c < \frac{mr_t j_{ub} - T_c \dot{R}_g}{R_g}$$

where $a_{ub}$ is an upper limit of the acceleration, $a_{lb}$ is a lower limit of the acceleration, $j_{ub}$ is an upper limit of the jerk, and $j_{lb}$ is a lower limit of the jerk.

Further, the following equation relates clutch torque $T_c$, engine torque $T_e$, and motor torque $T_m$:

$$T_c = f(T_e + T_m)$$

where f is a slip factor.

The slip factor is 1 when the clutch is in a lock state, and it becomes less than 1 when slippage occurs in the clutch. That is, the clutch torque is equal to the sum of the engine torque and the motor torque, but during slippage of the clutch, the clutch torque is proportional to a hydraulic pressure of the clutch, which is controlled based on the engine torque and the clutch torque. Further, because the clutch is independently controlled by the transmission control unit, it is almost impossible to estimate the clutch torque from an accurate hydraulic pressure of the clutch, so the clutch torque during the slippage of the clutch is determined by multiplying the clutch torque during the lock of the clutch by the factor f.

The mass of the vehicle m and the tire radius $r_t$ are constants, and the gear ratio $R_g$ and the engine torque $T_e$ are continuously changing variables.

The hybrid control unit 30 then calculates a maximum motor torque $T_{m\_max}$ and a maximum motor torque change rate $\dot{T}_{m\_max}$ when the vehicle acceleration is the upper limit of the acceleration and the vehicle jerk is the upper limit of the jerk in step S220.

The maximum motor torque $T_{m\_max}$ is calculated by the following equation 4 from the equations [1], [2], and [3];

$$T_{m\_max} = \frac{1}{f} \times T_{c\_max} - T_e = \frac{1}{f} \times \frac{a_{ub} m r_t}{R_g} - T_e$$

where $T_{c\_max}$ is a clutch torque when the vehicle acceleration is the acceleration upper limit $a_{ub}$, f is a slip factor, m is a vehicle mass, $r_t$ is a tire radius, $R_g$ is a gear ratio of the continuously variable transmission, and $T_e$ is an engine torque.

The maximum motor torque change rate $\dot{T}_{m\_max}$ is calculated by the following equation 5 from the equations [1], [2] and [3];

$$\dot{T}_{m\_max} = \frac{1}{f} \times \dot{T}_{c\_max} - \dot{T}_e = \frac{1}{f} \times \frac{j_{ub} m r_t - T_c \dot{R}_g}{R_g} - \dot{T}_e \quad \text{[Equation 5]}$$

where $\dot{T}_{c\_max}$ is a clutch torque change rate when the vehicle jerk is the jerk upper limit, f is a clutch slip factor, m is a vehicle mass, $r_t$ is a tire radius, $R_g$ is a gear ratio of the continuously variable transmission, $\dot{R}_g$ is a gear ratio change rate of the continuously variable transmission, $T_c$ is a clutch torque when the vehicle jerk is the jerk upper limit, and $\dot{T}_e$ is an engine torque change rate.

In equation 3, there is a linear relationship between the clutch torque $T_c$ and the sum of the engine torque $T_e$ and the motor torque $T_m$. However, the clutch torque $T_c$ can be determined as a nonlinear function of the sum of the engine torque $T_e$ and the motor torque $T_m$.

Then, the hybrid control unit 30 generates a motor torque command signal such that the motor torque and the motor torque change rate are respectively less than the calculated maximum motor torque and the maximum motor torque change rate, at step S230.

That is, if a demanded motor torque calculated based on current vehicle driving conditions (for example, a vehicle speed and a state of charge of the battery) is greater than the calculated maximum motor torque, or a motor torque change rate when the motor torque is changed to the demanded motor torque from a current motor torque is greater than the maximum motor torque change rate, a motor torque command signal corresponding to the calculated maximum motor torque is generated, and otherwise, a motor torque command signal corresponding to the demanded motor torque is generated.

A method for reducing the shock of the motor for the parallel hybrid electric vehicle according to the present invention may reduce the amount of motor shock generated during start-up or driving that is easily generated in the hybrid vehicle, by restricting the maximum value of the torque command and the torque change rate command that the hybrid control unit outputs to the motor control unit. Further, the maximum torque and the maximum torque change rate are continuously calculated based on the clutch state and the engine torque change so that the motor shock can be reduced in any situation and the motor can be operated at optimal efficiency. Furthermore, the problems of drivability of the hybrid electric vehicle can be ameliorated by accomplishing both the reduction of the motor shock and the maximum use of the motor torque. Therefore, fuel economy can be substantially increased.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for reducing motor shock of a parallel hybrid electric vehicle equipped with a continuously variable transmission, the method comprising:

calculating an upper limit of acceleration and an upper limit of jerk of the vehicle based on a vehicle speed;

calculating a maximum motor torque and a maximum motor torque change rate based on the calculated upper limit of acceleration and the upper limit of jerk; and generating a motor torque command to control a motor, such that a motor torque of the motor is less than the calculated maximum motor torque and a motor torque change rate of the motor is less than the calculated maximum motor torque change rate.

2. The method of claim 1, wherein the maximum motor torque is calculated by the following equation:

$$T_{m\_max} = \frac{1}{f} \times T_{c\_max} - T_e = \frac{1}{f} \times \frac{a_{ub}mr_t}{R_g} - T_e$$

where $T_{m\_max}$ is the maximum motor torque, $a_{ub}$ is the upper limit of the acceleration, $T_{c\_max}$ is a clutch torque when the vehicle acceleration is the upper limit of the acceleration, f is a slip factor, m is a mass of the vehicle, $r_t$ is a tire radius, $R_g$ is a gear ratio of the continuously variable transmission, and $T_e$ is an engine torque.

3. The method of claim 2, wherein the slip factor is equal to 1 when the clutch is locked, and the slip factor decreases as an amount of slip increases.

4. The method of claim 1, wherein the maximum motor torque change rate is calculated by the following equation:

$$\dot{T}_{m\_max} = \frac{1}{f} \times \dot{T}_{c\_max} - \dot{T}_e = \frac{1}{f} \times \frac{j_{ub}mr_t - T_c \dot{R}_g}{R_g} - \dot{T}_e$$

where $\dot{T}_{m\_max}$ is the maximum motor torque change rate, $j_{ub}$ is the upper limit of the jerk, $\dot{T}_{c\_max}$ is a clutch torque change rate when the jerk of the vehicle is the upper limit of the jerk, f is a slip factor, m is a mass of the vehicle, $r_t$ is a tire radius, $R_g$ is a gear ratio of the continuously variable transmission, $\dot{R}_g$ is a gear ratio change rate of the continuously variable transmission, $T_c$ is a clutch torque when the jerk of the vehicle is the upper limit of the jerk, and $\dot{T}_e$ is an engine torque change rate.

5. The method of claim 4, wherein the slip factor is equal to 1 when the clutch is locked, and the slip factor decreases as an amount of slip increases.

6. The method of claim 1, wherein the maximum motor torque is calculated using the following equation:

$$T_{m\_max} = \frac{1}{f} \times T_{c\_max} - T_e = \frac{1}{f} \times \frac{a_{ub}mr_t}{R_g} - T_e$$

where $T_{m\_max}$ is the maximum motor torque, $a_{ub}$ is the upper limit of the acceleration, $T_{c\_max}$ is a clutch torque when the vehicle acceleration is the upper limit of the acceleration, f is a slip factor, m is a mass of the vehicle, $r_t$ is a tire radius, $R_g$ is a gear ratio of the continuously variable transmission, and $T_e$ is an engine torque.

7. The method of claim 6, wherein the slip factor is equal to 1 when the clutch is locked, and the slip factor decreases as an amount of slip increases.

8. A system for reducing a motor shock of a parallel hybrid electric vehicle, comprising:

an engine for generating engine torque by burning fuel;

a motor for generating motor torque using electrical energy of an electrical energy storage unit;

a continuously variable transmission coupled to the engine and the motor and configured to receive the engine and motor torques, where the continuously variable transmission performs gear shifting;

a motor control unit for controlling operation of the motor; and a hybrid control unit outputting a motor torque command signal to the motor control unit, the hybrid control unit being programmed to perform a method comprising:

calculating an upper limit of acceleration and an upper limit of jerk of the vehicle based on a vehicle speed;

calculating a maximum motor torque and a maximum motor torque change rate based on the calculated upper limit of acceleration and upper limit of jerk; and generating a motor torque command such that motor torque is less than the calculated maximum motor torque and a motor torque change rate is less than the calculated maximum motor torque change rate.

9. The system of claim 8, wherein the maximum motor torque is calculated by the following equation:

$$T_{m\_max} = \frac{1}{f} \times T_{c\_max} - T_e = \frac{1}{f} \times \frac{a_{ub}mr_t}{R_g} - T_e$$

where $T_{m\_max}$ is the maximum motor torque, $a_{ub}$ is the upper limit of the acceleration, $T_{c\_max}$ is a clutch torque when a vehicle acceleration is the upper limit of the acceleration, f is a slip factor, m is a mass of the vehicle, $r_t$ is a tire radius, $R_g$ is a gear ratio of the continuously variable transmission, and $T_e$ is an engine torque.

10. The system of claim 8, wherein the maximum motor torque change rate is calculated by the following equation:

$$\dot{T}_{m\_max} = \frac{1}{f} \times \dot{T}_{c\_max} - \dot{T}_e = \frac{1}{f} \times \frac{j_{ub}mr_t - T_c\dot{R}_g}{R_g} - \dot{T}_e$$

where $\dot{T}_{m\_max}$ is the maximum motor torque change rate, $j_{ub}$ is the upper limit of the jerk, $\dot{T}_{c\_max}$ is a clutch torque change rate when a jerk of the vehicle is the upper limit of the jerk, f is a slip factor, m is a mass of the vehicle, $r_t$ is a tire radius, $R_g$ is a gear ratio of the continuously variable transmission, $\dot{R}_g$ is a gear ratio change rate of the continuously variable transmission, $T_c$ is a clutch torque when the jerk of the vehicle is the upper limit of the jerk, and $\dot{T}_e$ is an engine torque change rate.

11. A method for reducing motor shock in a hybrid electric vehicle, comprising:
    calculating an upper limit of acceleration and an upper limit of jerk of the vehicle based on a speed of a hybrid electric vehicle;
    calculating a maximum motor torque and a maximum motor torque change rate based on the calculated upper limit of acceleration and the upper limit of jerk; and
    generating a motor torque command to control a motor, such that a motor torque of the motor is less than the calculated maximum motor torque and a motor torque change rate of the motor is less than the calculated maximum motor torque change rate.

12. The method of claim 11, wherein the maximum motor torque change rate is calculated by the following equation:

$$\dot{T}_{m\_max} = \frac{1}{f} \times \dot{T}_{c\_max} - \dot{T}_e = \frac{1}{f} \times \frac{j_{ub}mr_t - T_c\dot{R}_g}{R_g} - \dot{T}_e$$

where $\dot{T}_{m\_max}$ is the maximum motor torque change rate, $j_{ub}$ is the upper limit of the jerk, $\dot{T}_{c\_max}$ is a clutch torque change rate when the jerk of the vehicle is the upper limit of the jerk, f is a slip factor, m is a mass of the vehicle, $r_t$ is a tire radius, $R_g$ is a gear ratio of a continuously variable transmission, $\dot{R}_g$ is a gear ratio change rate of the continuously variable transmission, $T_c$ is a clutch torque when the jerk of the vehicle is the upper limit of the jerk, and $\dot{T}_e$ is an engine torque change rate.

13. The method of claim 12, wherein the slip factor is equal to 1 when the clutch is locked, and the slip factor decreases as an amount of slip increases.

14. A system for reducing a motor shock in hybrid electric vehicle, comprising:
    an engine for generating engine torque by burning fuel;
    a motor for generating motor torque using electrical energy from a battery;
    a continuously variable transmission coupled to the engine and the motor via a clutch, where said continuously variable transmission is configured to receive the engine torque and motor torque and to shift between gears;
    a motor control unit for controlling operation of the motor; and
    a hybrid control unit outputting a motor torque command signal to the motor control unit, the hybrid control unit including instructions for generating a motor torque command such that motor torque is less than a calculated maximum motor torque and a motor torque change rate is less than the calculated maximum motor torque change rate.

15. The system of claim 14, wherein said control unit includes further instructions for calculating an upper limit of acceleration and an upper limit of jerk of the vehicle based on a vehicle speed and calculating a maximum motor torque and a maximum motor torque change rate based on the calculated upper limit of acceleration and upper limit of jerk.

16. The system of claim 14, wherein the maximum motor torque is calculated by the following equation:

$$T_{m\_max} = \frac{1}{f} \times T_{c\_max} - T_e = \frac{1}{f} \times \frac{a_{ub}mr_t}{R_g} - T_e$$

where $T_{m\_max}$ is the maximum motor torque, $a_{ub}$ is the upper limit of the acceleration, $T_{c\_max}$ is a clutch torque when a vehicle acceleration is the upper limit of the acceleration, f is a slip factor, m is a mass of the vehicle, $r_t$ is a tire radius, $R_g$ is a gear ratio of the continuously variable transmission, and $T_e$ is an engine torque.

17. The system of claim 14, wherein the maximum motor torque change rate is calculated by the following equation:

$$\dot{T}_{m\_max} = \frac{1}{f} \times \dot{T}_{c\_max} - \dot{T}_e = \frac{1}{f} \times \frac{j_{ub}mr_t - T_c\dot{R}_g}{R_g} - \dot{T}_e$$

where $\dot{T}_{m\_max}$ is the maximum motor torque change rate, $j_{ub}$ is the upper limit of the jerk, $\dot{T}_{c\_max}$ is a clutch torque change rate when a jerk of the vehicle is the upper limit of the jerk, f is a slip factor, m is a mass of the vehicle, $r_t$ is a tire radius, $R_g$ is a gear ratio of the continuously variable transmission, $\dot{R}_g$ is a gear ratio change rate of the continuously variable transmission, $T_c$ is a clutch torque when the jerk of the vehicle is the upper limit of the jerk, and $\dot{T}_e$ is an engine torque change rate.

* * * * *